United States Patent [19]

Henslee et al.

[11] Patent Number: 4,514,518

[45] Date of Patent: Apr. 30, 1985

[54] FLUORIDE-SUBSTITUTED COBALT SPINELS

[75] Inventors: Walter W. Henslee; Stephen I. Foster, both of Lake Jackson, Tex.

[73] Assignee: The Dow Chemical Company, Midland, Mich.

[21] Appl. No.: 370,700

[22] Filed: Apr. 22, 1982

Related U.S. Application Data

[63] Continuation of Ser. No. 247,428, Mar. 25, 1981, abandoned.

[51] Int. Cl.$^3$ .................. C01G 51/04; C01G 51/08; B01J 23/74
[52] U.S. Cl. ...................... 502/229; 204/290 F; 423/472; 423/464
[58] Field of Search ............... 252/441, 472; 423/464, 423/462, 594, 472; 204/290 F; 502/229, 524

[56] References Cited

U.S. PATENT DOCUMENTS

| | | | |
|---|---|---|---|
| 4,073,873 | 2/1978 | Caldwell | 252/472 |
| 4,110,251 | 8/1978 | Lauder | 252/441 |
| 4,402,924 | 9/1983 | McVicker et al. | 502/229 X |

OTHER PUBLICATIONS

Portier, *Comptes Rendus*, Sec. C, vol. 270, (Jun. 1970), pp. 2142-2145.

*Primary Examiner*—Jack Cooper
*Attorney, Agent, or Firm*—W. J. Lee

[57] ABSTRACT

A new and useful family of compounds is prepared by fluoride substitution into a cobalt oxide spinel, the new compounds conforming substantially to the empirical formula $Co_3O_xF_y$ or $M_1'M_2''—M_i''Co_{(3-\Sigma)}O_xF_y$, where $x+2y\cong4$, where y is an amount such that $F\leq2$ wt. % of the compound, and where $M_1$, $M_2$, and $M_i$ each represent metal values other than Co. Thus the cobalt oxide spinel may be a single-metal spinel, a bimetal spinel, a trimetal spinel, or a polymetal spinel.

7 Claims, No Drawings

FLUORIDE-SUBSTITUTED COBALT SPINELS

This is a continuation of application Ser. No. 247,428, filed Mar. 25, 1981, now abandoned.

BACKGROUND OF THE INVENTION

Cobalt oxide spinel, identified by the empirical formula $Co_3O_4$, is known. Spinels are a class of compounds with a particular crystal structure denoted by the general formula $AB_2O_4$, where A and B can be the same or different metals as long as the total metal valence equals eight. It is also known that electroconductive substrates having a coating of $Co_3O_4$ are useful as an electrode material, especially anode material, for use in electrolytic processes, such as brine electrolysis, chlorine cells, chlorate cells, and the like.

It is also known that various metal cations can be substituted into the cobalt oxide spinels to produce bimetal spinels, trimetal spinels, and polymetal spinels, where cobalt comprises only one of the metals in the crystalline oxide lattice structure.

We have now found, surprisingly and unexpectedly, that fluoride anions can be substituted into the cobalt oxide spinels, replacing a portion of the oxygen anions.

SUMMARY OF THE INVENTION

Fluoride-containing substituents are added to the mixutre from which cobalt oxide spinels are prepared, thereby forming cobalt oxide spinels (including single-metal, bimetal, trimetal, and polymetal cobalt spinels) which contain fluoride anions in an amount of up to about 2 wt. % F in the compound, the F replacing a portion of the oxygen in the spinel. These spinels are useful, e.g., as electrocatalytic material which can be used as anodic surfaces in brine electrolysis or as a catalyst in hypochlorite decomposition.

DETAILED DESCRIPTION OF THE INVENTION

The fluoride-substituted cobalt oxide spinels contemplated within the purview of the present invention are those which confirm substantially to the empirical formulae $Co_3O_xF_y$ and $M_1'M_2''—M_i''Co_{(3-\Sigma)}O_xF_y$, where $x+2y\cong 4$,
where y is an amount such that F is up to about 2 wt. % of the compound,
where $M_1$, $M_2$, and $M_i$ each represent a metal other than Co, but which may be equal to each other, and $'$, $''$, and $n$ represent their respective valences,
where $\Sigma$ represents the sum of other metal components of the spinel, such that the overall stoichiometry and structure is maintained with the weighted sum of all metal valences equal to about eight.

For example, the spinel $Ni_{0.3}{}^{+2}Fe_{0.7}{}^{+2}Fe_{0.8}{}^{+3}Co_{1.2}{}^{+3}O_xF_y$ contains, by summation of the metal valences times their indicated amounts, a total metal valence of eight. The expression "about eight" as used above is an indication that not all the spinel crystals are necessarily perfectly balanced stoichiometrically and that some defects in the charge balance can occur; these imperfections are often found to be beneficial by enhancing the catalytic properties of the spinels.

Cobalt oxide spinels (including single-metal, bimetal, trimetal, and polymetal spinels) are generally formed in the temperature range of about 200° C. to about 600° C. by heating of precursor metal compounds which are thermally-decomposable. At lower temperatures there is a tendency to incompletely decompose the precursor compounds and at higher temperatures the spinels tend to convert to other oxides, such as, e.g., CoO. Generally, it is preferred that temperatures in the range of about 300° C. to about 450° C. be used in order to substantially avoid having unwanted compounds in the desired spinels. "Single-metal" refers to cobalt by itself, "bimetal" refers to cobalt with one other metal variety, "trimetal" refers to cobalt with two other metal varieties, "polymetal" refers to cobalt with more than two other metal varieties. A given metal may be present as two varieties; e.g., iron can be present as $Fe^{+2}$ and $Fe^{+3}$ in the same spinel structure.

The spinels of this invention are referred to, generally, as cobalt oxide spinels because cobalt is the predominant metal, even though significant amounts of other metal cations may be substituted for part of the cobalt, giving bimetal, trimetal, or polymetal structures. The cobalt oxide spinels are still called "oxides" in the present invention because the fluoride substitution does not replace a majority portion of the oxide anions.

The fact that fluoride has substituted for oxygen in the crystal lattice of the spinel is discernible by high resolution X-ray diffraction. A change in the cell constant which corresponds to percent fluoride substitution is observed. This fluoride found in the spinel crystal structure is distinguishable from residual fluoride precursor compounds since the latter would be leachable using an appropriate solvent.

The precursor metal compounds from which the metal cations of the spinel structures are derived may be metal compounds containing organic moieties, but inorganic metal compounds such as nitrates, acetates, sulfates, or carbonates are preferred. Metal nitrates are especially preferred. The metal compounds must, of course, be thermally decomposable to yield metal oxides, the form of the oxide obtained being largely dependent on the temperature used for the thermal oxidation as discussed above.

The source of the fluoride anions may be any thermally-decomposable fluoride compound or may be the fluoride of one of the metals used in making the spinel. For instance, $CoF_2$ is especially suitable. Other fluoride anion sources are, e.g., $NH_4F$, HF, $NH_4BF_4$, and the like.

In making the spinels of the present invention the precursor compounds can be ground together and decomposed or can be dissolved in water, in water/alcohol mixtures, in water/acetone mixtures, or in some other solvent which evaporates during the spinel-making process. In some cases, a carrier may be used which dissolves some, but not all, of the precursors. If the spinels are to be prepared in-situ on a substrate, such as on an electroconductive electrode member, it is best if the metal spinel precursor compounds are dissolved in a carrier and that the in-situ coating on the substrate be laid down by repeating, alternately, the steps of applying the solution and heating to form the spinel; in this manner a substantial coating, which is contiguous and well-adhered, can be produced on the substrate.

The recommended time of heating is inversely related to the temperature of heating, ranging from several minutes at 600° C. to several hours at 200° C. Within the preferred range of 300° C. to about 450° C. a heating time in the range of about 15 minutes to about 60 minutes is generally sufficient to produce the spinel without running the risk of overheating which could convert some of the spinel to other oxide forms.

If the spinels are intended to be used as catalytic material, e.g., to accelerate decomposition of hypochlorite, then a particulate or granular support may be used. Such a support need not be electroconductive, but may be inorganic or ceramic such as glass beads, alumina particles, and the like. In this case it is recommended that repeated applications of dissolved precursors, followed by heating to spinel-forming temperature range, be performed.

The application of the spinel precursor materials to substrates may be done in any convenient manner, such as by dipping, spraying, painting, and the like.

If unsupported particles of spinel are desired, these may be prepared by simply heating the precursor compounds, or a solution thereof, to the decomposition point in an inert container. The product can then be ground and sized as desired for further processing, e.g., pelletizing with or without other ingredients such as burn-out agents, binders, and/or modifier oxides.

Titanium is widely heralded as an electroconductive substrate onto which various metal oxides, including spinels, are coated for use as electrode material in electrolytic proceses, such as brine electrolysis.

The $M'$, $M''$, and $M^n$ metals are preferably of the alkali metal series, the alkaline earth metal series or of the fourth period of the transition metal series, such as Fe, Ni, Cu, Zn, and the like.

The following examples are meant to illustrate the present invention, but the present invention is not limited to the embodiments illustrated.

EXAMPLE 1

To an aqueous solution of approximately 4M Co(NO$_3$)$_2$ the desired amount of fluoride ion is added. The resulting solution is decomposed in air at about 375° C. to form the fluoride-substituted cobalt spinel. The amount of fluoride in the spinel is controlled via the amount of fluoride added to the Co(NO$_3$)$_2$ solution. It is found that there is a saturation limit for fluoride in the spinel structure, which is about 2% based on total weight. At a molar ratio of approximately 2:1 for Co:F in the solution, one obtains a spinel with approximately 2% F by weight.

The fluoride ion is determined to be effectively supplied by CoF$_2$, HF, NH$_4$F, or NH$_4$BF$_4$. The spinel structure is confirmed by X-ray diffraction analysis. Weight percent F is determined by chemical analysis.

The following Table I illustrates the lattice parameters (Å) obtained at different F-substitution levels in the empirical formula Co$_3$O$_x$F$_y$, compared with Co$_3$O$_4$ as a control.

TABLE I

| Wt. % F by Chemical Analysis | X-ray Diffraction Lattice Parameter (Å) |
|---|---|
| 0 | 8.0815 |
| 0.5 | 8.0870 |
| 0.66 | 8.0880 |
| 1.15 | 8.0930 |
| 1.95 | 8.1010 |

The above data, when plotted on a graph, define a straight line.

We claim:

1. The fluoride-substituted cobalt spinel compounds conforming substantially to the formula Co$_3$O$_x$F$_y$,
   where $x + 2y \cong 4$ and where y is an amount, not zero, such that $F \leq 2$ weight percent of the compound,
   said cobalt oxide spinels being characterized as being substantially unstable at temperatures above 600° C.

2. The spinels of claim 1 when coated onto an electroconductive substrate.

3. The spinels of claim 1 when coated onto particulate matter.

4. The spinels of claim 1 when coated onto ceramic, glass, metal, or refractory particles.

5. The spinels of claim 1 when coated onto alumina pellets.

6. The spinels of claim 1 when coated onto a titanium substrate.

7. The spinels of claim 1 when pellitized.

* * * * *

UNITED STATES PATENT AND TRADEMARK OFFICE
CERTIFICATE OF CORRECTION

PATENT NO. : 4,514,518
DATED : April 30, 1985
INVENTOR(S) : Walter W. Henslee and Stephen I. Foster It is certified that error appears in the above—identified patent and that said Letters Patent is hereby corrected as shown below:

Col. 1, line 29; reads "mixutre" should read --mixture--.

Col. 1, line 41; reads "fluoride" should read --florine--.

Col. 2, line 22; reads "fluoride" should read --florine--.

Col. 3, line 23; reads "proceses" should read --processes--.

Col. 4, line 40; reads "pellitized" should read --pelletized--.

Signed and Sealed this

Third Day of December 1985

[SEAL]

Attest:

DONALD J. QUIGG

Attesting Officer  Commissioner of Patents and Trademarks